United States Patent [19]
Stahle

[11] 3,908,610
[45] Sept. 30, 1975

[54] HOUSING FOR A ROTARY ENGINE

[75] Inventor: Hermann Stahle, Heilbronn, Germany

[73] Assignees: Audi Nsu Auto Union Aktiengesellschaft, Neckarsulm; Wankel, G.m.b.H., Lindau, both of Germany

[22] Filed: Dec. 10, 1973

[21] Appl. No.: 423,160

[30] Foreign Application Priority Data
Dec. 21, 1972 Germany............................. 2262618

[52] U.S. Cl. ............... 123/8.01; 123/8.45; 418/179; 29/156.4 R
[51] Int. Cl.² .......................................... F02B 55/08
[58] Field of Search .......... 418/179; 123/8.01, 8.45, 123/8.09; 29/156.4 R

[56] References Cited
UNITED STATES PATENTS
3,512,907   5/1970   Belzner ............................... 418/179

Primary Examiner—Clarence R. Gordon
Attorney, Agent, or Firm—Raymond P. Wallace; Victor D. Behn

[57] ABSTRACT

A peripheral housing of lightweight metal for a rotary engine, having a layer of hard material on its inner surface, with an island of the lightweight basis metal surrounding the spark plug ignition channel exposed at the inner surface and flush therewith, and the method of fabricating the same.

2 Claims, 3 Drawing Figures

U.S. Patent  Sept. 30,1975  3,908,610
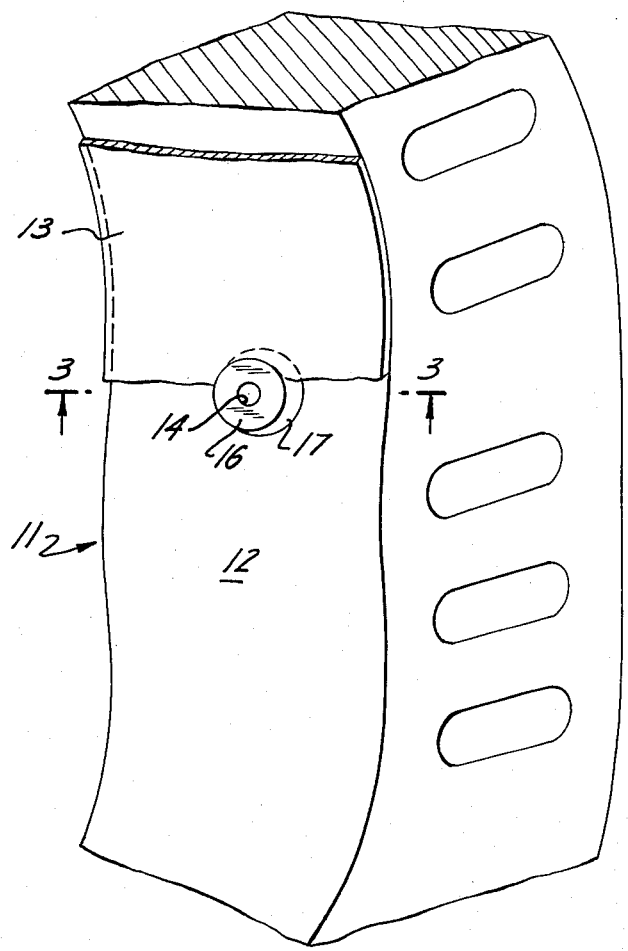
FIG.1
FIG.2
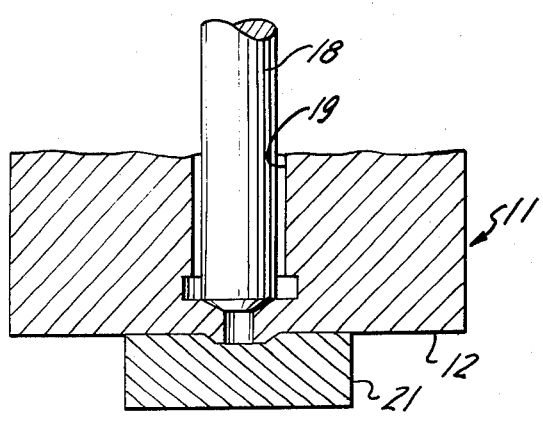
FIG.3
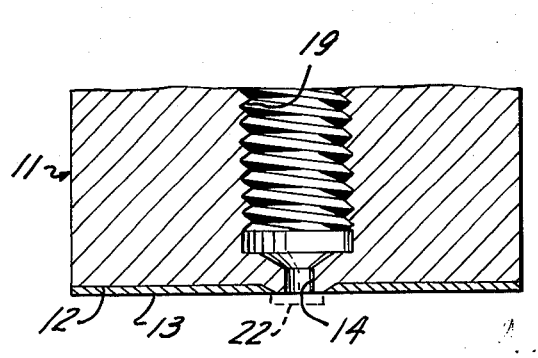

HOUSING FOR A ROTARY ENGINE

BACKGROUND OF THE INVENTION

This invention relates to a peripheral housing for a rotary internal combustion engine, and more particularly to such a housing formed of lightweight basis metal having a hard coating layer on the inner surface but leaving the basis metal exposed at the outlet of the ignition channel, and to the method of fabricating the same.

Rotary engines are known wherein the trochoidal housing has its inner surface coated with a layer of hard, wear-resistant material, applied either galvanically or by flame spraying. Such an engine with a coating layer on the inner surface of the peripheral housing is shown in U.S. Pat. No. 3,712,767. Such coatings are commonly applied to housing shells formed of lightweight metals, such as aluminum or alloys thereof, which is desirable for keeping the weight of the engine low. The housing has at least one recess therein for the installation of a spark plug, with an ignition channel leading from the spark plug recess to the interior of the housing to lead the spark to the combustion chamber.

However, very high temperatures occur at the region of the outlet of the ignition channel at the coated surface, and because of the difference in thermal expansion between the lightweight basis metal and the material of the hard coating this may cause cracks in the coating in the region of the outlet of the ignition channel. Such cracks may cause the coating to flake off around the channel orifice, or if there is a good adhesion of the coating to the basis metal such cracks may become prolonged into that metal and after reaching a cooling channel in the housing shell will allow a water leakage into the operating chambers of the engine.

Attempts have been made to relieve this drawback by boring and threading the spark plug cavity straight through the shell and positioning an insert of highly heat-conductive metal having the ignition channel therethrough at the inner end of the cavity, the insert having its surface flush with the inner surface of the housing. It is also known to make the inner end of the cavity with a conical flare, extend the coating layer into this conical opening, and position an insert having a mating flare in the cavity so that the edge of the coating is covered by the flare of the insert. Such expedients are shown in U.S. Pat. No. 3,512,907. However, they require very accurate machining and fitting of the parts and hence are very expensive, and the retention of the inserts by the material of the housing shell is sometimes insecure.

SUMMARY

The present invention solves these problems by providing a peripheral housing for a rotary engine having the inner surface of the basis metal coated with a hard, wear-resistant material, and with the ignition channel orifice surrounded by an island of the basis metal having a surface flush with the surface of the hard material. There is also provided a rapid and inexpensive method of fabricating a shell having such a protruding island. Instead of machining away the inner surface of the basis metal to leave the protrusion before applying the hard coating, the basis metal at the bottom of the spark plug cavity is struck by means of a punch and die to form a protrusion on the inner surface at least as high as the thickness of the coating material in its finished state. When the applied hard coating is machined or ground to its final thickness, the island of basis metal bearing the ignition channel orifice is left protruding therethrough and flush with the surface. Thus the hard coating layer is spaced away from the hottest zone immediately surrounding the ignition channel and the problem of differential expansion in that area is avoided.

It is therefore an object of this invention to provide a peripheral housing shell for a rotary engine having a coating layer on the inner surface, with an island of the basis metal of the housing having the ignition channel therein flush with the inner surface of the coating layer.

It is another object to provide such a housing shell wherein the inner coating layer is not exposed to the high temperature immediately surrounding the orifice of the ignition channel.

A further object is to provide a rapid and inexpensive method of fabricating such a peripheral housing shell.

Other objects and advantages will become apparent on reading the following specification in connection with the accompanying drawing.

BRIEF DESCRIPTION OF THE DRAWING

FIG. 1 is a fragmentary perspective view of a rotary engine peripheral housing shell, showing the inner surface having a hard coating layer thereon and an island of the basis metal containing the ignition channel extending through the coating;

FIG. 2 is a semischematic cross-sectional elevation of punch and die meeans for producing the protruding island of the housing; and FIG. 3 is a fragmentary cross-section on line 3—3 of FIG. 1.

DESCRIPTION OF THE PREFERRED EMBODIMENTS

In FIG. 1 there is shown a portion of a generally annular peripheral housing shell 11 which with a pair of end walls (not shown) will define the engine cavity of a rotary internal combustion engine. The shell 11 is cast in a lightweight basis metal, such as aluminum or one of its alloys, and has its inner surface 12 machined to receive a hard coating. A layer 13 of hard coating material is provided on the surface 12 of the basis metal, so as to serve as a runway for the sealing means of the internal combustion engine. Such coatings are known in the art, and may comprise a flame sprayed layer of hard material selected from various compositions, or a galvanically applied layer containing principally a metal such as nickel and incorporating hard particles.

Before the application of the coating 13, an ignition channel 14 communicating with the spark plug cavity is bored in the housing shell. It is desirable, for the reasons given above, that the surface region immediately surrounding the orifice of the ignition channel in the engine should consist of the basis metal of the housing rather than of the hard coating layer. However, this region of basis metal should be flush with the surface of the coating, in order to provide smooth running of the seals and to obviate gas leakage between chambers. There is therefore produced a circular island 16, concentric with the ignition channel and having a sloping side wall 17, of basis metal raised above the surface 12 of the remainder of the basis metal of the housing.

It would be impractical and very expensive to machine around such an island when machining the trochoidal surface 12 of the housing. In FIG. 2 there is shown punch and die means of raising the island 16. A punch 18 having a frustoconical end is inserted into the spark plug cavity 19, coaxial therewith. The spark plug cavity at this point in the operation may be only a preliminary bore as shown in FIG. 2, or may be already threaded for the plug as in FIG. 3. A die member 21 is positioned against the trochoidal surface 12, the die having an appropriate cavity therein coaxial with the ignition channel. The punch 18 is then struck to drive the metal of the housing shell into the die cavity to form the island 16. It is to be understood that the showing of FIG. 2 is schematic only, and that the punch and die means need not necessarily have the precise forms shown.

The cavity in the die member must be at least as deep as the finished thickness of the coating to be applied, so that the surface of the island will be flush therewith. In general it is preferable to have the die cavity approximately equal in depth to the thickness of the rough coating before finishing, so that the surface of the island will be finished therewith. The diameter of the surface of island 16 may be from about two to about three times the diameter of the ignition channel, although it may be greater when intended for use in engines which run particularly hot.

The hard coating layer 13 is then applied to the trochoidal wall 12 by one of the known techniques mentioned above, and subsequently finished off to a smooth surface and the desired dimension, as shown in FIG. 3. Although the coating as applied may cover the surface of island 16, this causes some difficulty in the finishing operation, owing to the nonuniform pressure on the tool until the height of the island is reduced. Accordingly, it is preferable to apply cover meeans 22 to the surface of the island during deposition of the coating; the cover means is shown in dotted line in FIG. 3.

When the coating is deposited galvanically, the cover means 22 may be a resist, as is well known in the art, and removed by a solvent before the finishing operation. If the coating layer is to be flame sprayed, the cover means may be a plate of the same diameter as the surface of the island and having a retaining stem extending through the ignition channel. In either case, no more than the surface of the island 16 should be covered, so that the coating layer is deposited on the sloping side wall 17 and adheres firmly thereto.

In finishing the runway 13 from its rough thickness a portion of the surface of the island 16 will also be machined away, so that the final surface will be smooth and continuous without any interruption, but with the region surrounding the ignition channel orifice formed of the lightweight metal of the housing, and the hard surface of the coating layer beginning only at a certain distance therefrom.

In some engines there are a plurality of ignition channels, distributed either in the circumferential direction or in the axial direction, or in both such directions. In such cases an island of basis metal is provided for each ignition channel.

What is claimed is:

1. A peripheral housing shell, for use in a rotary internal combustion engine having a housing comprising a peripheral shell and a pair of end walls defining an engine cavity, and a rotor disposed in the engine cavity and having sealing means sweeping the inner surface of the peripheral shell in sealing relation therewith, wherein the improvement comprises:
    a. the peripheral shell being formed of a lightweight basis metal with its inner surface coated with a layer of hard material forming the sealing surface swept by the rotor sealing means;
    b. the peripheral shell having at least one spark plug recess therein and an ignition channel communicating between the spark plug recess and the engine cavity with its orifice at the sealing surface;
    c. the basis metal of the shell having an island of the basis metal protruding from its inner surface through the hard coating layer and surrounding the orifice of the ignition channel, the surface of the island being flush with the sealing surface; and
    d. the island having a sloping side wall between its surface and the inner surface of the peripheral shell, the sloping side wall being covered by the hard coating material.

2. The combination recited in claim 1, wherein the diameter of the exposed surface of the island is at least about twice the diameter of the ignition channel orifice.

* * * * *

Notice of Adverse Decision in Interference

In Interference No. 99,347, involving Patent No. 3,908,610, H. Stahle, HOUSING FOR A ROTARY ENGINE, final judgment adverse to the patentee was rendered Apr. 6, 1977, as to claim 1.

[*Official Gazette August 2, 1977.*]